United States Patent [19]

Ossko et al.

[11] 3,865,858

[45] Feb. 11, 1975

[54] HYDROSILYLATION EMPLOYING DICARBONYLDICHLOROPLATINUM AS A CATALYST

[75] Inventors: Andreas Ossko; Heinz Goller, both of Cologne; Joachim Herzig, Leichlingen; Werner Büchner, Opladen-Luetzenkirchen; Armand deMontigny, Leverkusen, all of Germany

[73] Assignee: Bayer Aktiengesellschaft, Leverkusen, Germany

[22] Filed: Oct. 2, 1973

[21] Appl. No.: 402,665

[30] Foreign Application Priority Data
Oct. 19, 1972 Germany............................ 2251297

[52] U.S. Cl........... 260/448.2 E, 252/441, 252/472, 260/46.5 R, 260/448.8 R
[51] Int. Cl................................................ C07g 7/08
[58] Field of Search . 260/448.2 E, 448.8 R, 46.5 R; 252/472, 441

[56] References Cited

UNITED STATES PATENTS

| | | | |
|---|---|---|---|
| 2,823,218 | 2/1958 | Speier | 260/448.2 E |
| 2,970,150 | 1/1961 | Bailey | 260/448.2 E X |
| 3,159,601 | 12/1964 | Ashby | 260/46.5 R |
| 3,159,662 | 12/1964 | Ashby | 260/448.8 R X |
| 3,410,886 | 11/1968 | Joy | 260/448.2 E |
| 3,470,225 | 9/1969 | Knorre et al. | 260/448.2 E |
| 3,631,086 | 12/1971 | Seyfried et al. | 260/448.2 E |

*Primary Examiner*—Paul F. Shaver
*Attorney, Agent, or Firm*—Burgess, Dinklage & Sprung

[57] ABSTRACT

In the production of an organosilicon compound by addition of a silicon compound selected from the group consisting of a hydrogenosilane and a hydrogenosiloxane to an olefinically unsaturated organic compound in the presence of a catalytically active platinum compound, the improvement which comprises employing dicarbonyldichloroplatinum as the platinum compound.

3 Claims, No Drawings

HYDROSILYLATION EMPLOYING DICARBONYLDICHLOROPLATINUM AS A CATALYST

The invention relates to the known addition reaction of organosilicon compounds, containing hydrogen bonded to silicon, with organic compounds in which an aliphatic double bond exists between at least one pair of adjacent carbon atoms, the addition reaction taking place according to the equation

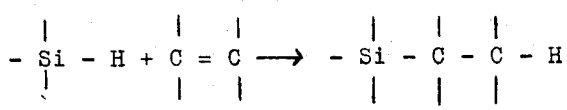

with the double bond being eliminated.

In order to obtain products of good quality in high yield and at satisfactory speed in this reaction, it is necessary to employ suitable catalysts so as not to have to raise the requisite temperature excessively, because of the danger of decompositions and side-reactions.

The use of such catalysts is in itself known. In industry, as a rule, either metallic platinum — if appropriate, deposited on suitable carriers, such as γ-alumina, silica gel, pyrogenically produced silicas or active charcoal — or compounds of platinum are employed. In these compounds, the platinum can possess the valence state zero, two or four. Charged or uncharged ligands can be bonded to the platinum atom to form a complex. Though the reaction is, in some cases, preferably carried out in a multi-phase system (for example solid catalyst - solution of a reaction mixture), it is conversely necessary in many cases to carry out the reaction in a homogeneous phase, e.g., if the reaction product must not be turbid but is of high viscosity. Procedures in which it is possible to dispense with the use of solvents or other substances not participating directly in the reaction are of particular interest industrially.

However, the platinum catalysts hitherto customary do not give satisfactory results in very many instances where they are used, due, e.g., to elimination of hydrogen, cross-linking of the siloxane up to the point of gel formation, or difficulties in metering, distribution and control of the reaction.

A new catalyst has now been discovered which does not suffer from the disadvantages mentioned. The process, to be carried out therewith, for the manufacture of organosilicon compounds by addition of hydrogenosilanes or hydrogenosiloxanes to olefinically unsaturated organic compounds in the presence of platinum compounds possessing a catalytic action is characterized in that dicarbonyldichloroplatinum is employed as the catalyst.

Dicarbonyldichloroplatinum is a known compound, which can be manufactured according to several known processes (compare, for example, Schützenberger, J. prakt. Chem. 2,4, 159 (1871)). This compound possesses the desired good solubility in the reaction medium and permits carrying out the reaction in a homogeneous phase without the conjoint use of a solvent.

The manufacture of dicarbonyldichloroplatinum can be carried out in a simple manner from commercially available substances and in almost quantitative yield. It is furthermore advantageous that dicarbonyldichloroplatinum can be manufactured directly in high purity, and again in almost quantitative yield, from platinum metal, platinum metal scrap or residues containing platinum metal, even in the presence of other metals of the platinum group.

With many hydrosilylation catalysts it is frequently observed, especially when the reaction is carried out in the presence of moisture or other hydroxy compounds, that the evolution of hydrogen from the hydrogenosilane is also promoted. This leads to changes in structure and to the formation of gas bubbles which become fixed in the material in the case of bodies of stable shape and thus, inter alia, cause a deterioration of the mechanical properties. Such disadvantages do not arise in the case of the catalyst according to the invention.

From the point of view that the range of application should be as broad as possible, a further fact which proves very advantageous is that the platinum compound used according to the invention is both colorless and odorless, in contrast to numerous known hydrosilylation catalysts.

Dicarbonyldichloroplatinum is sufficiently soluble in organic compounds and in organosilicon compounds to catalyze the addition reactions in a homogeneous phase. A concentration range of between 0.1 and 50 mg of the new catalyst per kilogram of reaction mixture has proved advantageous for this purpose; though the catalyst is also soluble in even higher concentration, the use of a greater amount than 100 mg per kilogram of mixture would be uneconomical because of the expensive nature of platinum. The process according to the invention is in principle applicable to any reaction according to the equation given initially.

The use of the catalyst according to the invention in no way narrows the range of application of the hydrosilylation reaction. The substances, and categories of substances, known for this type of reaction, including polymeric substances, can be employed as hydrosilylation agents. 1 to 3 hydrogen atoms must be bonded to at least one silicon atom of these compounds. In other respects, this hydrogenosilane can be substituted by the most diverse groups which do not inhibit the hydrosilylation reaction. As examples there may be mentioned: alkyl, alkenyl, aryl, aralkyl, alkaryl, alkoxy, acyloxy and alkoxyalkyl groups which can optionally also be halogenated, halogen atoms, siloxanyl groups and other substituents.

The compounds which can be reacted with hydrosilylating agents according to the invention can have the most diverse composition. All that is necessary is the presence of at least one olefinic double bond and the absence of substituents which are known to hinder the hydrosilylation, such as, for example, sulfide groups.

The use of the catalyst according to the invention does not produce any change in principle in how the reaction is carried out; the reaction can be carried out in a known manner in the presence or absence of solvents, fillers and the like, preferably in the temperature range of 0° to 200°C.

Since the addition reaction is markedly exothermic, adequate removal of the heat of reaction must be ensured in order to avoid overheating. This can be achieved by introducing one of the reactants initially, appropriately together with the catalyst, in order to keep the concentration of the latter high from the start, and gradually adding the other reactant after heating the vessel, or by using a continuous process in which both components are allowed to run simultaneously, in the stoichiometric ratio, into a reaction vessel, from which the reaction product is removed continuously, and the dimensions of which are such, in accordance with the amount flowing through, that the requisite removal of heat is ensured. In the last-mentioned case the solubility of the catalyst according to the invention, which can be mixed with one of the reactants, proves particularly advantageous, since no difficulties in metering arise here.

The possible uses of the reaction products obtained are extremely diverse. As examples, there will here only be mentioned their use for imparting hydrophobic and oleophobic properties, as release agents, as paints and as rubbers which can be vulcanized at room temperature or slightly elevated temperature.

The process according to the invention will be illustrated in the example given below.

EXAMPLE 1

115 g of methyldichlorosilane (technical grade) were added dropwise to 122 g of technically pure methylbutadiene and 2.47 × 10$^{-5}$ mole of cis-dicarbonyldichloroplatinum in 1,3,5,7-tetramethyl-1,3,5,7-tetravinylcyclotetrasiloxane (in the form of a mixture of 2 parts by weight of platinum compound in 60 parts by weight of siloxane), in a glass apparatus, and the mixture was heated to refluxing. Over the course of 36 hours, the temperature of the mixture rose gradually to 66°C. Fractional distillation of the mixture gave 122 g of an addition product of boiling point 50°–53°C/12 mm Hg and 42 g of higher-boiling products in addition to excess methylbutadiene.

EXAMPLE 2

A mixture of 100 g of vinyl acetate and 2 × 10$^{-5}$ mole of cis-dicarbonyldichloroplatinum was warmed to 60°C, methyldichlorosilane was added dropwise and thereafter the mixture was heated under reflux for 14 hours, in the course of which the sump temperature rose to 98°C. The reaction products were distilled and 99 g of an addition product of boiling range 75°–82°C/12 mm Hg were thereby obtained. A further 12 g of higher-boiling addition products remained in the distillation apparatus.

EXAMPLE 3

176 g of 1,3,5,7-tetramethyl-1,3,5,7-tetravinylcyclotetrasiloxane were mixed with 3.5 × 10$^{-5}$ mole of cis-dicarbonyldichloroplatinum and the mixture was warmed to 80°C. 115 g of methyldichlorosilane were added to this mixture, the speed of addition being so chosen that the temperature did not exceed 110°C. After completion of the addition, the mixture was stirred for a further hour at 100°C.

The reaction product was freed of volatile constituents (< 1 percent) by treating it for 1 hour at 30°C and 1 mm Hg. Yield: 288 g of addition products.

EXAMPLES 4 TO 6

A mixture of 17.2 parts of 1,3,5,7-tetramethyl-1,3,5,7-tetravinylcyclotetrasiloxane and 2 × 10$^{-6}$ mole of cis-dicarbonyldichloroplatinum in the form of a 3 percent strength benzene solution was homogeneously mixed with varying amounts of an oligosiloxane of average composition

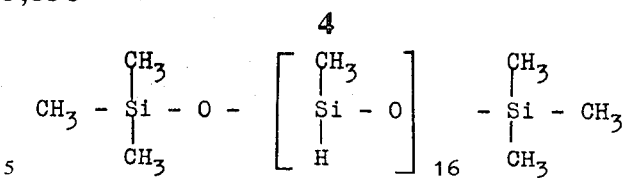

and the mixture was left to stand at 25°C.

Within 12 hours, high molecular condensation products formed, which when using (Example 4) 3 g of the above siloxane were of gel-like consistency, when using (Example 5) 6 g of the same siloxane were of soft consistency and when using (Example 6) 12 g, again of the same siloxane, were of glassy/brittle consistency.

EXAMPLES 7 TO 9

A siloxane manufactured in a known manner by alkaline polymerization of 99 parts by weight of 1,3,5,7-octamethylcyclotetrasiloxane, 1 part by weight of 1,3,5,7-tetramethyl-1,3,5,7-tetravinylcyclotetrasiloxane and 2 parts by weight of an oligosiloxane of the average composition

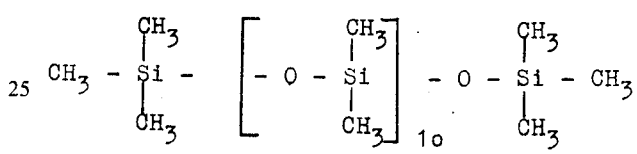

was mixed with an amount of dicarbonyldichloroplatinum which coresponded to 20 mg of platinum in 1 kg of polymer mixture. The hydrosilylation agent added to 250 g of this mixture was according to Example 7, 3.6 g of a siloxane of the average composition

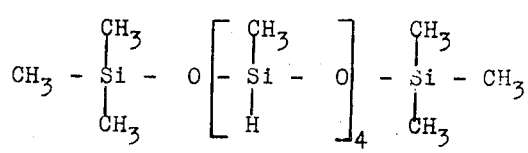

according to Example 8, 3.4 g of a siloxane of the average composition

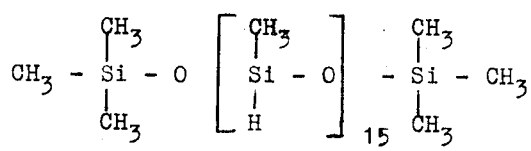

and, according to Example 9, 7.67 g of a siloxane mixture, manufactured in a known manner by co-hydrolysis of the halogenosilanes, of average composition

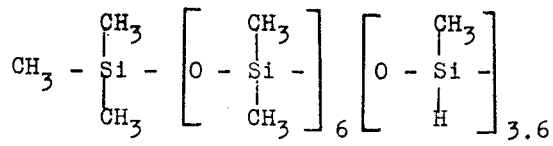

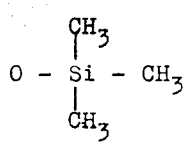

and the composition was intimately mixed. The mixtures crosslink at room temperature to give elastomers.

EXAMPLE 10

100 g of vinylsiloxane from Example 7 were mixed with 5 g of a methylhydrogenosiloxane of the composition

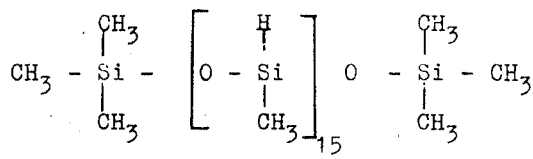

and in each case 10 mg of platinum in the form of (A) hexachloroplatinic acid/i-propanol; (B) a platinum compound manufactured according to U.S. Pat. No. 3,288,879, Example 1; (C) platinumcarbonylpyridine dichloride/benzene; and, according to the invention, in the form of (D) dicarbonyldichloroplatinum/benzene, were added as the catalyst; the whole was again mixed and left to stand at room temperature. The results after 2 hours and after waiting for 24 hours are shown in the tabulation which follows:

Table:

| Mixture | Curing after 2 hours | 24 hours waiting time Surface nature | Color | Evolution of odor | Evolution of hydrogen |
|---|---|---|---|---|---|
| A | No | Tacky | None | None | Strong |
| B | No | Tacky | Grey-brown | Strong | Little |
| C | No | Tacky | Grey-brown | None | Little |
| D | Yes | Non-tacky | None | None | Little |

Other olefinically unsaturated compounds which may be similarly reacted include:
Styrene, acrylic acid, methacrylic acid, propylene, butene, iso-butene, butadine, chloroprene, polymers and copolymers of the following components:
$vime_2SiO_{0.5}$ (vi = vinyl, me = methyl) and $me_2SiO$;
$vime_2SiO_{0.5}$, $meC_6H_5SiO_2$ and $me_2SiO$; $vime_2SiO_{0.5}$, $me_2SiO_{0.5}$ and $me_2SiO$; $vime_2SiO_{0.5}$, $me_3SiO_{0.5}$ and $SiO_2$; $me_3SiO_{0.5}$, $vimeSiO$ and $SiO_2$; $C_6H_5meviSiO_{0.5}$ and $me_2SiO$;
$vime_2SoO_{0.5}$, $meC_6H_5SiO$ and $meSiO$;
$vimeC_6H_5SiO_{0.5}$, $me_3SiO_{0.5}$ and $SiO_2$.

Other hydrogenosilanes and hydrogenosiloxanes which may be similarly reacted include:
$(meHSiO)_4$, $(me_2HSiO_{0.5})_2$, $(C_6H_5)_2meSiH$, $(C_6H_5meHSiO_{0.5})_2$, polymers and copolymers of the following components:
$SiO_2$, $me_2SiO$ and $meHSiO_{0.5}$;
$me_3SiO_{0.5}$, $me_2HSiO_{0.5}$, $meHSiO$ and $me_2SiO$;
$me_3SiO_{0.5}$, $me_2HSiO_{0.5}$ and $SiO_2$;
$me_2HSiO_{0.5}$ and $SiO_2$.

It will be appreciated that the instant specification and examples are set forth by way of illustration and not limitation, and that various modifications and changes may be made without departing from the spirit and scope of the present invention.

What is claimed is:

1. In the production of an organosilicon compound by addition of a silicon compound selected from the group consisting of a hydrogenosilane and a hydrogenosiloxane to an olefinically unsaturated organic compound in the presence of a catalytically active platinum compound, the improvement which comprises employing dicarbonyldichloroplatinum as the platinum compound.

2. The process of claim 1, wherein the dicarbonyldichloroplatinum is employed in the amount of about 0.1 to 100 mg per kg of reaction mixture.

3. The process of claim 1, wherein the silicon compound is at least one member selected from the group consisting of an alkyl-, alkenyl-, aryl-, aralkyl- alkaryl-, alkoxy-, acyloxy- and alkoxyalkyl-hydrogenosilane or -hydrogenosiloxane.

* * * * *